United States Patent [19]

Blount et al.

[11] 4,252,042
[45] Feb. 24, 1981

[54] FEEDING MECHANISM FOR BATTERY STOCK

[75] Inventors: Philip E. Blount; Roy N. Moore, Jr., both of Greeneville, Tenn.

[73] Assignee: Ball Corporation, Muncie, Ind.

[21] Appl. No.: 13,780

[22] Filed: Feb. 21, 1979

[51] Int. Cl.³ .............................................. B26D 7/06
[52] U.S. Cl. ........................................ 83/278; 83/33; 83/903
[58] Field of Search ............................ 83/33, 278, 903

[56] References Cited

U.S. PATENT DOCUMENTS

| | | | |
|---|---|---|---|
| 641,333 | 1/1900 | Saltzkoin et al. | 83/278 |
| 764,851 | 7/1904 | Hutchins | 83/278 |
| 1,966,903 | 7/1934 | Piepenbring et al. | 83/278 X |
| 2,220,523 | 11/1940 | Kaganski | 83/278 X |
| 2,458,538 | 1/1949 | Socke | 83/33 |
| 2,648,380 | 8/1953 | Socke | 83/33 |
| 2,721,612 | 10/1955 | Almgren | 83/278 X |
| 2,779,590 | 1/1957 | Seastoom | 83/278 X |
| 3,079,825 | 3/1963 | Biben | 83/33 X |

*Primary Examiner*—J. M. Meister
*Attorney, Agent, or Firm*—Gilbert E. Alberding

[57] ABSTRACT

A method and apparatus is described for feeding grid stock through a punch and die arrangement so that the spaced apart slots are equally spaced during the progression of the grid stock. The feed mechanism for strip stock comprises reciprocating punch means, die means associated with said reciprocating punch means to cooperate to punch out a group of spaced-apart slots in said strip stock, supporting means associated with said punch and die means to support said strip stock during its advance, a pair of members slidably mounted to said supporting means to operate on adjacent groups of spaced-apart slots in said strip stock to positively feed said stock away from said punch and die means, and means timed in respect to the reciprocation of said punch and die means and operative thereby, while said die means is raised from said punch means, to impart feeding movements to said feed stock.

11 Claims, 6 Drawing Figures

FEEDING MECHANISM FOR BATTERY STOCK

BACKGROUND OF THE INVENTION

The present invention relates to a method and apparatus for feeding or advancing grid stock material and finds adaptation in the battery grid industry and, in particular, relates to the feeding of workstock to provide cut out portions therein whereby the feeding provide equal slot placement and progression of the workstock.

The subject invention specifically is addressed to methods and apparatus for feeding grid structures having open networks therein whereby the structures are oriented and dimensioned to a predetermined size. Such grid structures are generally made by expanding a metal workstock to form an open network structure and thereafter applying paste thereto by means readily available in the art.

Conventional stock strip feeding devices associated with machine tools including punch presses generally feed stock strip ahead at uniform speeds and the starting and stopping of the feeding movements may oftentimes be so sudden that additional mechanisms are required to insure correct progression. It is generally found that the feeding mechanism is positively actuated, the results being that anything interferring with the advance movement of the stock strip may and frequently will damage the feeding mechanism to say nothing of the stock itself being fed therethrough.

In the feeding mechanism to be described herein the stock strip is not pushed forward to the punch and die means but is drawn rearward or away from said means after an initial punching has been produced. This is important especially when the stock strip is a thin sheet metal such as encountered with lead or lead alloys which would readily buckle under a forward pushing action. Thus, the feeding mechanism herein described relates to advancing relatively soft metals in stock strip form. Moreover, this invention relates to an arrangement that utilizes the openings or slots cut in the stock material itself as an element in determining the accurate feed movement and progression of said stock material.

The step of expansion in the process to form an expanded stock structure may be readily made by conventional processes, such as disclosed in U.S. Pat. No. 3,891,459. After expansion, the expanded structure is subjected to a cutting operation wherein spaced-apart slots are cut from a central unexpanded portion thereof. In accordance with this invention the stock material is advanced into and out of the cutting facility by the feeding mechanism herein described. The process and feeding device for carrying out the invention will be described in more detail hereinafter. Following the cutting step the expanded structure is pasted, the pasting operation being accomplished by moving the structure into a zone where an active material, generally a thick, lead-containing paste, is applied to the open grid network. Various means may be used to apply the active material to the network of the expanded structure.

Briefly, in accordance with this invention, a process and machine is described for feeding battery grid stock through a cutting machine to cut out a group of at least two spaced-apart slots therein, the feeding mechanism comprising supporting means associated with the cutting machine to support the stock during its advance, a pair of members slidably mounted to the supporting means to operate on adjacent groups of spaced-apart slots in the stock, and means timed in respect to said cutting machine and operating to impart feeding movements to said pair of members and hence to said stock.

The aforementioned features with the objects and advantages which become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

An example of the invention is illustrated in the accompanying drawings in which.

SUMMARY OF THE INVENTION

Figure 1:
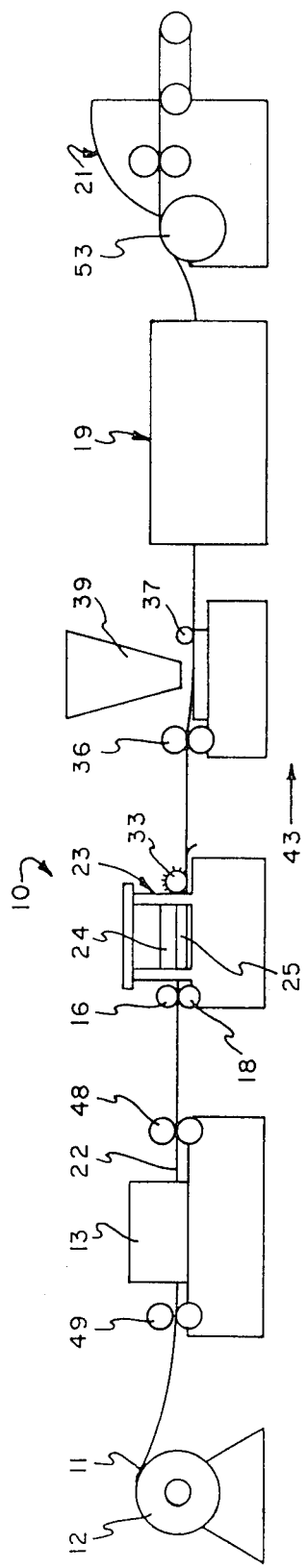
FIG. 1 is a schematic flow diagram.

It has been found in accordance with this invention that a rather unique yet simplistic design and construction afford a highly useful means for feeding and progressing a sheet or web material of connected grid structures having a multiplicity of slots therein.

It is accordingly an object of the present invention to provide a self-correcting feeding and progression device having few functional parts and of unitary and economic construction.

It is another principal object of the invention to provide a device of the character herewithin described which has means for advancing a continuous strip of soft, metallic material for use in conventional battery manufacturing operations.

It is still another object of this invention to provide means for commercial alloys for a lead battery facility, the means providing a proper slot placement and advancing mechanism for battery strip stock.

These and other objects of the invention will become more readily apparent from a review of the specification, claims and a study of the attached drawings.

DETAILED DESCRIPTION OF THE INVENTION

Referring now more particularly to the accompanying drawings, 10 indicates generally a conventional battery grid line along with the essential features of the instant invention. The grids are made initially from an unexpanded metal strip 11 of metal, such as lead or lead-base alloys, drawn from a pay off roll 12 and is conveyed to a conventional expanding machine 13 in which the strip 11 is expanded to form a grid structure 22 by reciprocating slitting and expanding cutters (not shown), the strip itself being advanced step by step lengthwise into the expanding machine. Generally, the expanding machine 13 has its cutters situated to converge on the center of the strip in the direction the strip is advanced. There results from such an expansion operation the grid structure 22 having an open network 32 comprising a plurality of skeletal, wire-like elements 14 (FIG. 4) connected one to the other by nodes 15, each node 15 and elements 14 extending diagonally through the grid structure in a more or less honeycomb or diamond-like fashion.

Following expansion, the expanded strip 22 is laid down into substantially the same plane as the original unexpanded strip 11 from which it was formed by advancing the strip 22 through leveling rollers 48 located near the exit end of the expanding machine 13.

Figure 6:
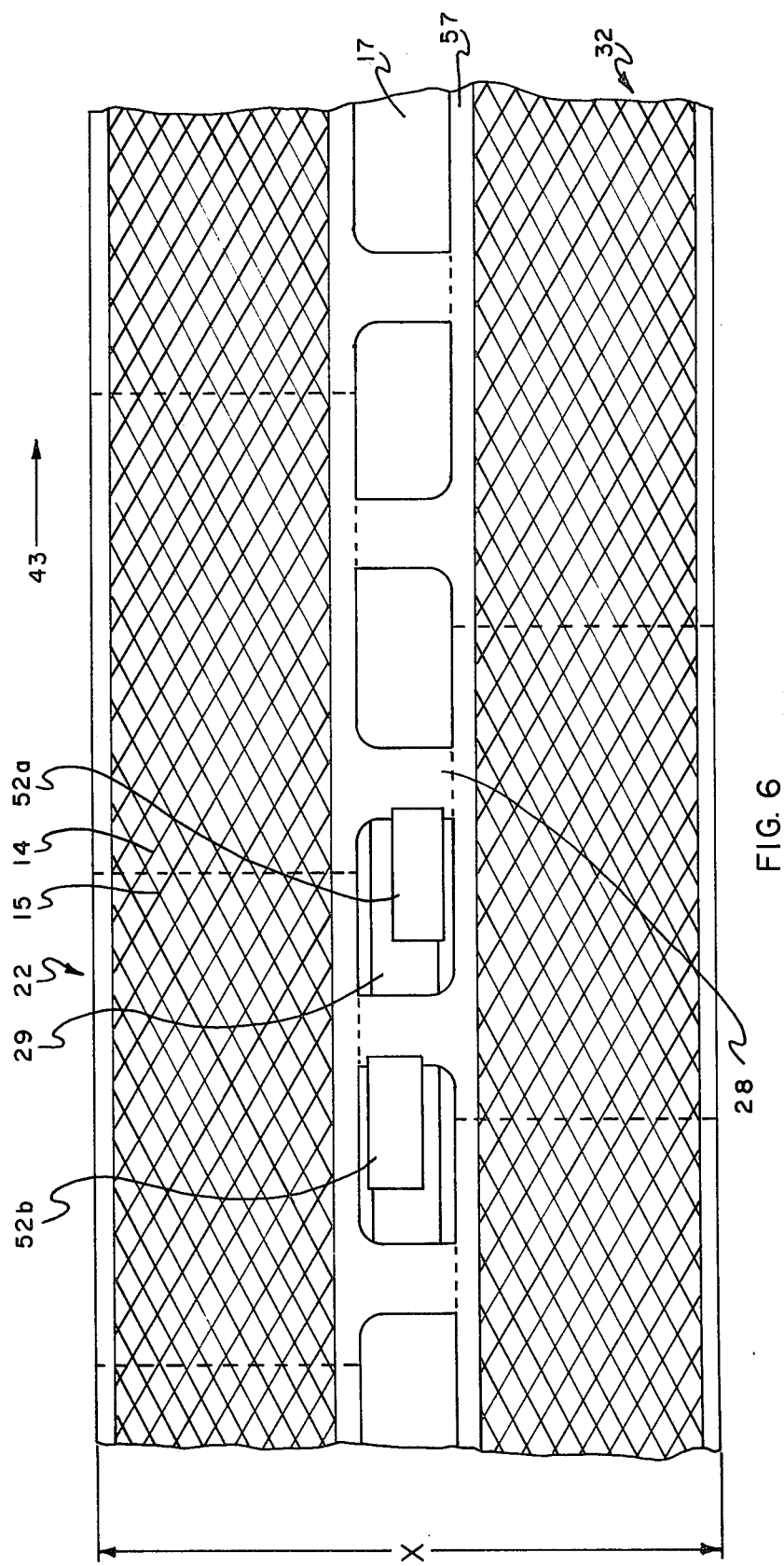
FIG. 6 is a plan view of unsectionalized grid structures.

After leveling of the expanded strip, the strip is fed into a scrap removal or cut out and sizing machine 23. In this operation cut out sections 17 are formed and the pieces so cut out are removed from the strip, this being readily accomplished by at least two punch and die arrangements connected to machine 23. The cut out portions define the lug or header 28 for the individual battery grids. At the same time the expanded strip 22 is subjected to this cut out operation, the open network is subjected to a sizing process so that the structure is formed to a predetermined grid thickness, the elements being worked so that the structure is formed to a desired angular moment. Moreover, the sizing apparatus is so designed that during the working operation, the strip is confined to a specified dimension indicated as x in FIG. 6 and, therefore, the grid strip is perfectly sized to a predetermined width.

Figure 4:
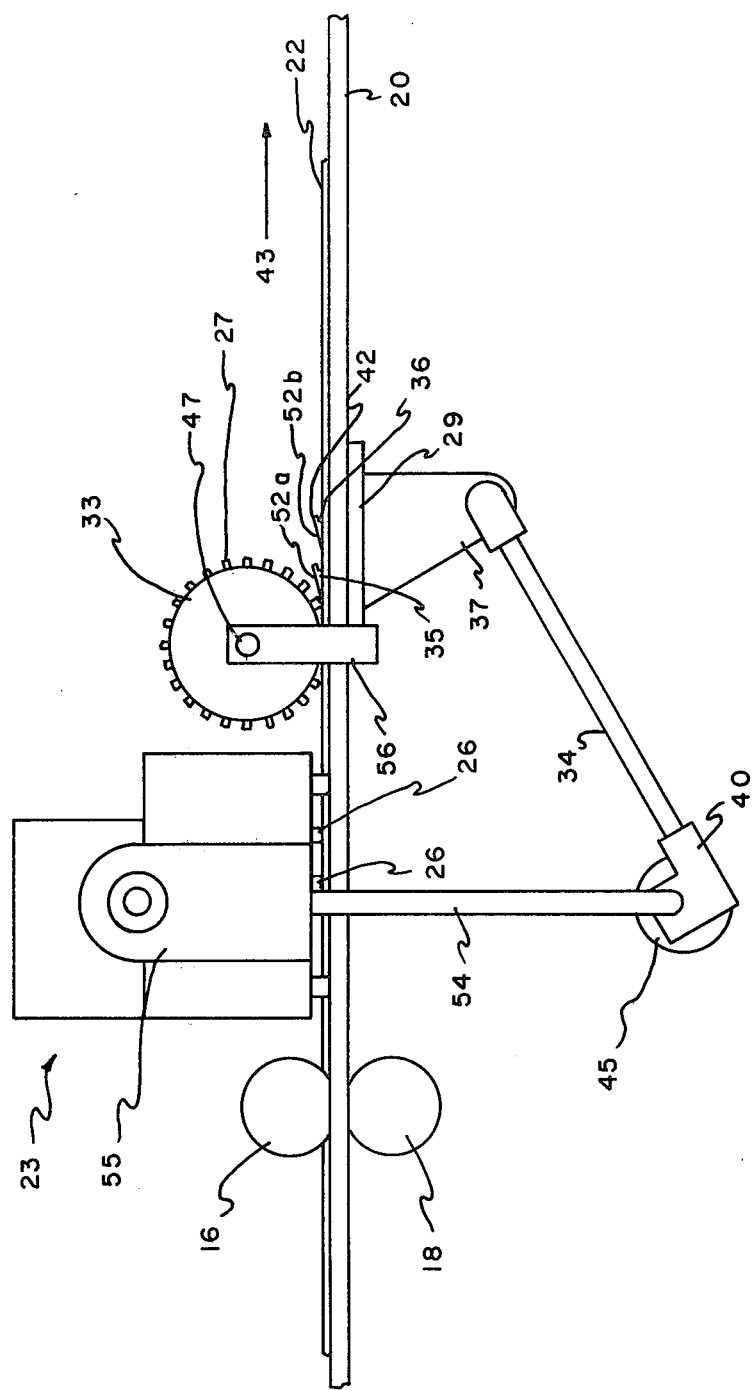
FIG. 4 is a side elevational view of the arrangement of the subject invention.
Figure 5:
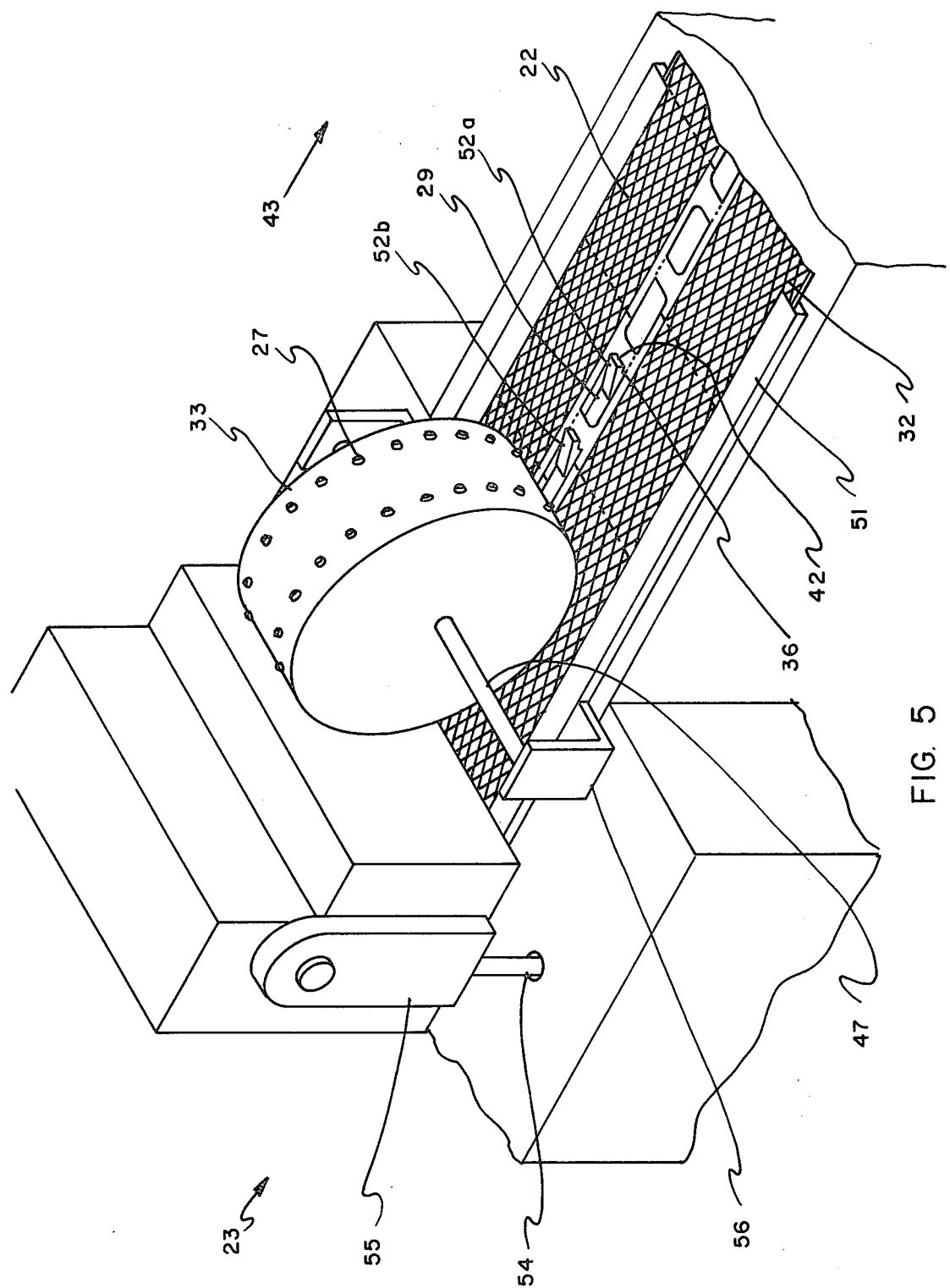
FIG. 5 is a isometric view of the subject invention.

The device of the subject invention, in the form illustrated in the drawings and, in particular FIGS. 4 and 5, is employed to advance the strip through the scrap removal and sizing machine 23. Referring principally to FIG. 4 the organization of the instant invention includes a base plate 20 on which is mounted a carriage or slide 29 that is adapted to be reciprocated by a device to be described in greater detail hereinafter in a stock feeding direction 43.

After removal of the scrap portions 17 which go into forming a lug or header 28 with concurrent sizing or working of the open network, the expanded grid strip 22 is conveyed to the next operation and is there ready for pasting via pasting machine 39. The pasting machine may employ flush pasting or belt pasting using conventional pasting techniques as are well-known in the art. The pasted grid structure is thereafter cured or dried by a conventional drying oven 19. The dried grid structure is then advanced to the plate separator 21 device where the structures are sectionalized one from the other into individual grid structures.

Figure 2:
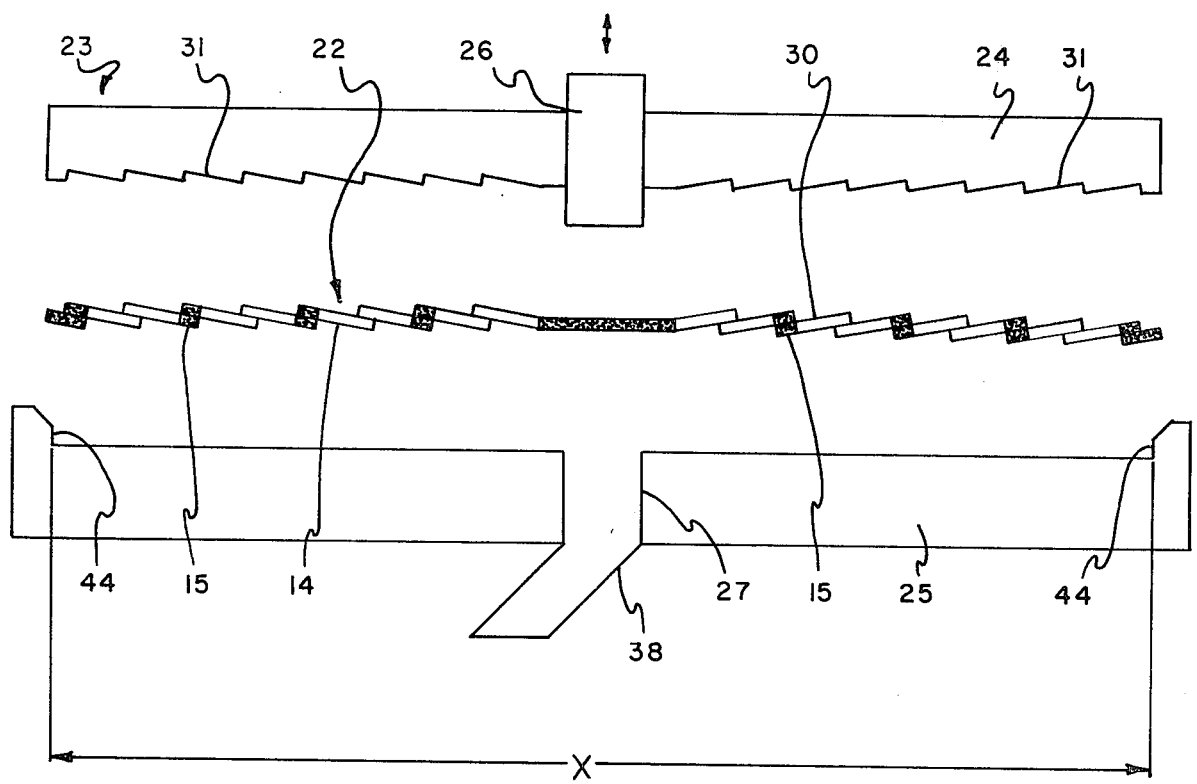
FIG. 2 is a front elevational view of the punch and die arrangement.
Figure 3:
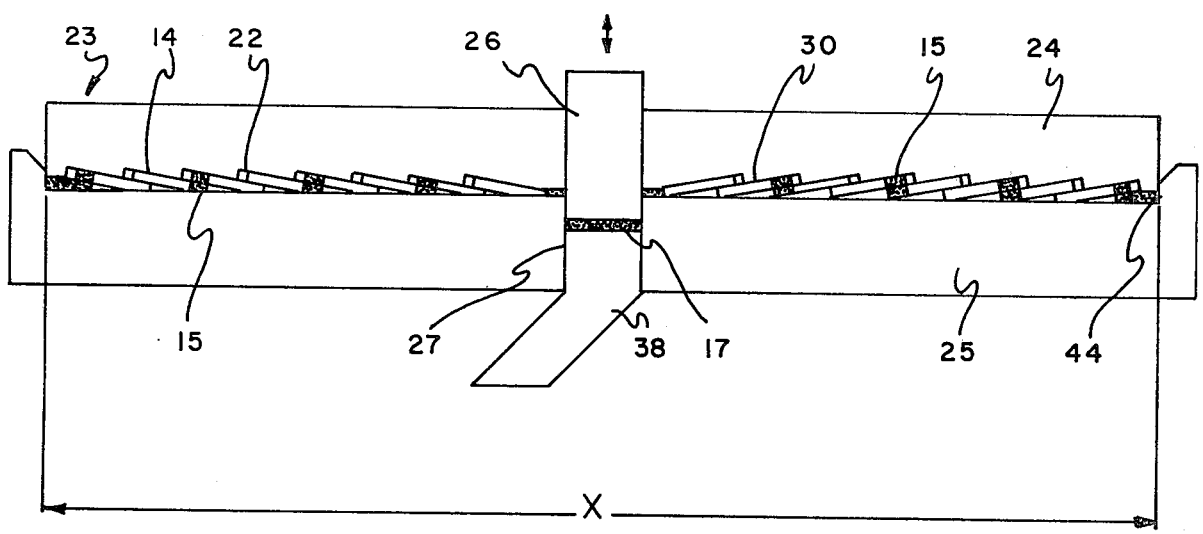
FIG. 3 is a further front elevational view of the punch and die arrangement showing the same in a closed relationship.

Referring to FIGS. 2 and 3, the sizing and orienting apparatus 23 is shown which comprises an upper plate 24 that is adapted to reciprocate within a housing (not shown) so that an upper plate 24 comes into contact with a lower plate 25. Of course, a wide range of means may be used to reciprocate the plate or plates, such means being well-known to those skilled in the art. It can be seen that the upper plate 24 is provided with punches 26 (only one being shown here) which are set above complementary dies 27 into which the punches pass in order to cut out openings within the unexpanded central portion of a stock material. The cut out portions 17 set free pass down a chute 38. An array of inclined planes 31 is connected to the lower part of the upper plate 24 and is arranged to come into engagement with the open network of grid structure 30. Thus, expanded strip 22 to be sized and oriented is pressed between an array of inclined planes 31 and the lower plate 25. In FIG. 3, the closed form of the sizing and orienting apparatus 23 is depicted with the grid structure 30 showing its nodes 15 being oriented. In effect, the faces of the nodes are brought into contact with the inclined planes 31 when the plate 24 is brought downwardly and the faces of the nodes 15 are brought into contact with the flat portion of lower plate 25. In this fashion, the expanded strip 22 is oriented so that the opposite faces of the nodes 15 are worked to a predetermined angle. The grid structures are formed to a uniform size by the inclined planes 31 and the walls 44 of the lower plate 25, length X in FIGS. 2 and 3. By the process and apparatus, a plurality of grid structures 30 that are to be further pasted and sectionalized may be worked and sized all at the same time in a most economic manner. Thus, in operation after the expanded strip 22 has been formed, it is advanced by means, in combination, through the orienting and sizing apparatus 23 which comprises a reciprocating upper plate 24 having a plurality of inclined planes 31 thereon along with centrally located punches 26. Again, the inclined planes 31 are so disposed outwardly of the plate and engage the nodes 15 of the grid network. Thus, as the expanded strip 22 is momentarily halted in its advance over the lower plate 25, the upper plate 24 is brought downwardly and into contact therewith where the punches 26 cut out portions 17 that fall through a chute 38 and the inclined planes 31 provided by the upper plate work the nodes 15 to orient and size the grid structure. It can be readily appreciated that the inclined planes 31 of the upper plate 24 are so arranged that the grid structure is readily formed as determined by the angle of said inclined planes 31 and the distance between the walls 35 of the apparatus. It will be further appreciated that the strip is firmly anchored by engagement of the punch and dies as the array of inclined planes work the nodal portions of the grid network. This renders a most uniform structure.

Describing the instant device in more detail and referring to FIGS. 4 and 5, there is shown the feeding mechanism in accordance with this invention. Tensioning drums 16 and 18 are connected to a base 20 and retain the workstock and hold the same from slipping. The stock is passed beneath and through the punch and die arrangement 23 described above and thereafter the stock advanced under a wheel 33, suitably supported for rotation by a shaft 47. It is to be noted that wheel 33 carries two series of radially projecting pins or sprockets 27 that mate and engage the open network 32 to provide guidance and stoppage of lateral movement of the workstock. A carriage or slide 29 is set within a guide frame 50 so as to be freely slidable between predetermined positions. Spaced-apart on the upper side of carriage 29 are two members 52a and 52b that are pivotally secured to slide 29 by a pin 35 and are gently biased upwardly by a spring 36. The members are provided with engaging surfaces 42 that engage the cut out portions of the strip stock. To the bottom portion of carriage 29 is a fin 37 having mounted thereto for movement a connecting rod 34, coupling fin 37 to a bar 40. The bar 40 is connected to a crank shaft 45.

The mechanism is so timed that when the slots are being cut out the stock is halted momentarily until the punches 26 are disengaged whereafter the stock continues on its advance by the pulling movements of the pair of members 52a and 52b. Thus, the stock advances intermittently and synchronously with the die and punch arrangement. Of course, the means for transforming the movement of the punch and die arrangement into movement of the carriage are well within those means known to those skilled in the art.

A preferred operation is to cut out at least a pair of slots at one time. In the strip herein described a group of two cut out portions are shown but it is to be understood that a group of three or more could also be concurrently cut out at one time. It is only important that the pair of members engage the cut out slots in such a fashion that the members bridge or connect cut out slots of an adjacent group. This can conveniently be done as in the case of a two die cut out by merely leaving one slot open between the die arrangement and the engaging members. It is advantageous that the pair of members engage the trailing slot of one series or group of concurrently cut out slots with the leading slot of an adjacent series or group of slots.

The movement of the punches into and out of the dies is so synchronized that when the punch is engaged and has severed the at least two cut out portions from the stock strip the two members are disengaged from the stock, sliding beneath the stock until they reach their most rearward position. Upon disengagement of the punch from the die the two members have engaged and advanced the stock strip so that by the time the punch is ready to engage again the members have fed the stock forward, the members having completed a full feed before the punches are engaged again.

Consideration of the subject invention will show to one skilled in the art that the mechanism has the feature of being self-correcting. This may be understood from considering the device where two cut out portions are removed at one time. Thus, there are two slots cut on each die stroke and the distance between the trailing edge of one lug or header to the trailing edge of the next lug or header is fixed between die strokes but is variable between adjacent die strokes. As can be appreciated, the fixed distance is a function of the die arrangement and will not change unless a new die arrangement is introduced. On the other hand, the variable distance is a function of the strip feed between die strokes. The distance between the two members is exactly the same as the fixed distance which is displaced where it feeds the strip at the variable distance. In this position it will self correct the variable distance necessary. That is to say, if the strip does not feed far enough, the variable distance will be too short and, therefore, on the first stroke the forward member will override the rear member and feed the strip the correct distance and also remain in phase. On the next stroke the rear member will override and advance the trailing edge of that lug or header that was made on a stroke that had been fed correctly. Any improper sections can be easily removed and discarded. If on the other hand the strip feeds too far, the variable distance will be too long. On the first stroke the rear member will override, it will be fed out of phase the amount of the error, but from then on the strip will feed correctly. Again any improper sections can be easily cut out and removed.

It is believed that a careful consideration of the specification in conjunction with the means depicted in the drawings will enable one skilled in the art to obtain a clear and comprehensive understanding of the subject matter of the invention, the features and advantages, mode of use and improved result which is assured the user.

The foregoing is considered as illustrative only of the principles of the invention. Further, since a number of modifications and changes will readily occur to those skilled in the art, it is not desired to limit the invention to the exact construction shown and described; and, accordingly, all suitable modifications and equivalents may be resorted to, falling within the purview of the invention as claimed.

What is claimed is:

1. A self-correcting feed mechanism for producing equally spaced slots in tandem on a strip stock comprising reciprocating punch means, die means associated with said reciprocating punch means to cooperate to punch out a group of spaced-apart slots in tandem in said strip stock, the adjacent slots within said group being at a first predetermined distance from one another, supporting means associated with said punch and die means to support said strip stock during its advance, a pair of members slidably mounted to said supporting means to operate on a slot from each of adjacent groups of spaced-apart slots in said strip stock to positively feed said stock away from said punch and die means, said pair of members being separated by a distance equal to a second predetermined distance and means timed in respect to the reciprocation of said punch and die means and operative thereby, while said die means is raised from said punch means, to impart feeding movements to said pair of members whereby the distance of feeding the stock during movement between adjacent groups is exactly the same as the first predetermined distance.

2. The feed mechanism as recited in claim 1 wherein the pair of members are operative on the trailing slot of one group and the leading slot of an adjacent group.

3. The feed mechanism as recited in claim 1 wherein the members are spring-urged pivotal dogs having a portion thereof engageable into and disengageable from said spaced-apart slots.

4. The feed mechanism of claim 1 wherein there is guiding means associated with said supporting means to properly guide said longitudinally along a predetermined path and thereby preventing any substantial lateral movement of said strip stock.

5. A self-correcting feeding mechanism for producing equally spaced slots in tandem on a strip stock comprising reciprocating punch means, die means associated with said reciprocating punch means to cooperate to punch out a series of spaced-apart slots in tandem in said stock, the adjacent slots within said series being at a first predetermined distance from one another, supporting means associated with said punch and die means to support said strip stock during its advance, a pair of members carried by a slide mounted to said supporting means to reciprocate lengthwise of said stock and engage at least one spaced-apart slot from each series of said spaced-apart slots in said strip stock to positively feed said strip stock forward, said pair of members being separated by a distance equal to a second predetermined distance, and means timed in respect to the movement of said punch means and operative thereby, while said punch means is raised from said die means, to impart feeding movements to said pair of members whereby the distance of feeding the strip stock during movement between adjacent series is exactly the same as the first predetermined distance.

6. The feeding mechanism as recited in claim 5 wherein the pair of members are bias members.

7. The feeding mechanism as recited in claim 5 including guide rails situated to contact the peripheral portions of said strip stock along its path through the feeding mechanism.

8. The feeding mechanism as recited in claim 5 provided with holding means situated after said punch and die means and said pair of members, said holding means contacting said stock and adopted to engage said stock along an expanded part thereof whereby the stock is held from making any substantial lateral movement during the passage through the feeding mechanism.

9. A feeding mechanism of claim 5 wherein the pair of members are provided with gripping surfaces for contact with the adjacent series of spaced-apart slots of the strip stock.

10. A self-correcting feeding mechanism to equally space a multiplicity of slots in a strip stock comprising reciprocating punch means, die means associated with said reciprocating punch means to cooperate to punch out groupings of spaced-apart slots in said stock in tandem, supporting means associated with said punch and die means to support said strip stock during its advance, the adjacent slots within said group being at a first predetermined distance from one another, a pair of biased members carried by a slide mounted to said supporting means to reciprocate lengthwise of said stock and operate on a slot from each of adjacent groupings of the spaced-apart slots in said strip stock to positively feed said strip stock forward, said pair of members engaging the trailing slot of one group and the leading slot of an adjacent group, the distance between said trailing and leading slots being equal to a second predetermined distance, and means timed in respect to the movement of said punch means and operative thereby, while said punch means is raised from said die means, to impart feeding movements to said pair of members whereby the distance of feeding the stock during movement between adjacent groupings is exactly the same as the first predetermined distance.

11. A self-correcting feeding mechanism to properly and equally space in tandem a multiplicity of slots in strip stock comprising tensioning means to gently bias said strip stock, reciprocating punch means, die means associated with said reciprocating punch means to cooperate to punch out groupings of spaced-apart slots in said strip stock, the adjacent slots within said grouping being at a first predetermined distance from one another, supporting means associated with said punch and die means to support said strip stock during its advance, a pair of members carried by a slide mounted to said supporting means to reciprocate lengthwise of said stock and engage a slot from each adjacent grouping of said strip stock to positively feed the strip stock forward, said pair of members being separated by a distance equal to a second predetermined distance, means timed in respect to the movement of said punch means and operative thereby, while said punch means is raised from said die means, to impart feeding movements of said pair of members, whereby the distance of feeding the stock during movement between adjacent groupings is exactly the same as the first predetermined distance, and holding means situated proximate said punch and die means and said pair of members, said holding means contacting said stock and adopted to engage said stock along an expanded part thereof whereby the stock is held from making any substantial lateral movement during the passage through said feeding mechanism.

* * * * *